May 30, 1961 D. A. AUGUSTIN 2,986,123
PNEUMATIC WINDOW LIFT
Filed Nov. 13, 1957 2 Sheets-Sheet 1

INVENTOR
DAROLD A. AUGUSTIN
BY Scrivener + Parker
ATTORNEYS

United States Patent Office 2,986,123
Patented May 30, 1961

2,986,123

PNEUMATIC WINDOW LIFT

Darold A. Augustin, Elyria, Ohio, assignor to Bendix-Westinghouse Automotive Air Brake Company, Elyria, Ohio, a corporation of Delaware Filed Nov. 13, 1957, Ser. No. 696,130

2 Claims. (Cl. 121—40)

This invention relates to power window-lift mechanisms for automotive vehicles and more particularly to pneumatic means for operating said mechanisms.

A principal object of the present invention is to provide for window-lift mechanisms, means for raising and lowering the window by the use of pneumatic pressure rather than by the use of electric motors and the like as has been customary heretofore.

A more specific object of the invention is to provide, for window-lift mechanisms for automotive vehicles, power means for lowering and raising the window comprising a pneumatically operated double-acting piston which is connected to the mechanism for operating the same in response to a valve controlled by an operator or passenger in the vehicle.

A still further object of the invention is to provide the aforesaid piston with relief valve means for limiting its opening or closing force and which, during closing movement, protects objects or a person's hand from being injured between the window and its frame.

Still another object of the invention is to provide with said double-acting piston means for limiting its speed of movement and also means for automatically locking and unlocking said piston when a window is to be moved to or from any desired position.

Other objects and their attendant advantages will become apparent as the following detailed description is read in conjunction with the accompanying drawings wherein.

Figure 1:
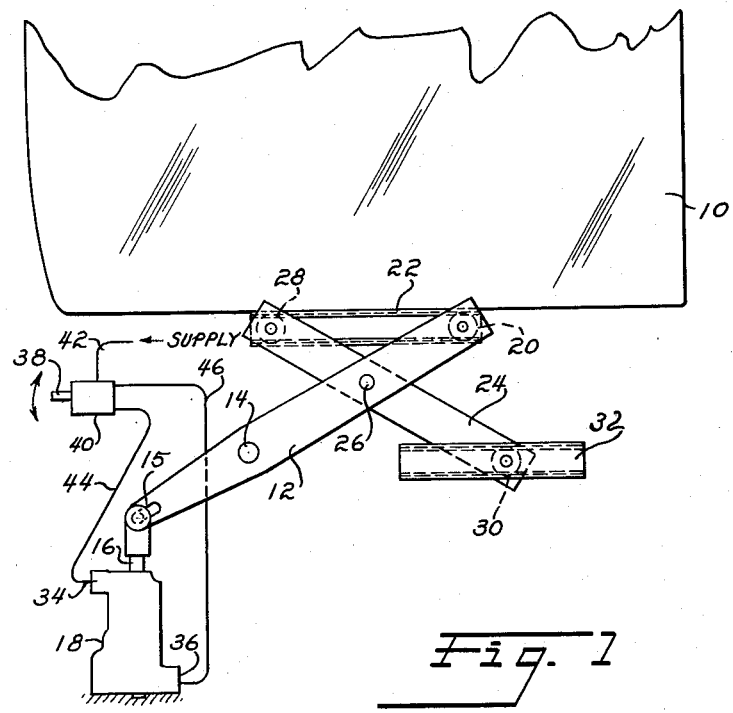
Fig. 1 is a schematic diagram showing the present invention in conjunction with a substantially conventional window-lift mechanism for an automotive vehicle.

Referring now to the drawings and particularly Fig. 1 thereof, there is shown a window 10 of the type employed in automotive vehicles having connected to its bottom edge a conventional raising or lowering linkage comprising an actuating arm 12 having intermediate its ends a fixed pivot 14. The inner end of the link 12 is pivotally connected as by a slotted aperture 15, to a suitable yoke integral with an actuating rod 16 of a double-acting piston carried in a cylinder casing 18 and later described in detail. The outer end of link 12 is connected to a suitable roller 20 which rides in a movable rail member 22 abutting the bottom of the window 10. A second link 24 is pivotally connected at 26 to link 12 intermediate fixed pivot 14 and roller 20 and the opposite ends of link 24 have connected thereto rollers 28 and 30 which respectively ride in movable rail 22 and a fixed rail 32.

From the foregoing it will be seen that when the inner end of link 12 is moved downwardly or counterclockwise about fixed pivot 14, the pivot point 26 will be moved upwardly and the rollers 20 and 28 will approach each other as the link 24 is moved in a direction toward the vertical thus raising the window. Upward movement of piston rod 16 will have a reverse effect thus lowering the window.

Piston rod 16 is moved in raising or lowering direction by means of pneumatic pressure acting on a double-acting piston 32 (Fig. 2) operating in the aforementioned cylinder casing 18. Pneumatic pressure is admitted either to an upper port 34 or a lower port 36 to raise or lower the piston depending on the position of a control valve handle 38 operating a valve in a valve block 40 which is supplied with pressure from a source (not shown) through a supply pipe 42. The control valve is of conventional construction wherein the handle 38 has a normal neutral position in which pressure is vented from the lines 44, 46 which respectively connect corresponding ports in said block with the aforesaid ports 34, 36 in the cylinder casing 18. When the lever 38 is raised it serves to connect the supply line 42 with the line 44 leading to upper port 34 thereby moving the piston downwardly to raise the window. During this operation the line 46 is connected through the valve block 40 with atmosphere so that there is no excess pressure below the piston to impede its downward movement. When the lever 38 is moved downwardly from its neutral position air pressure is admitted to the lower port 36 in casing 18 to raise piston 32 thereby lowering the window. When lever 38 is released it returns to its neutral position to connect both lines 44, 46 to atmosphere and the window is automatically locked in its desired position by locking means later described.

Figure 2:
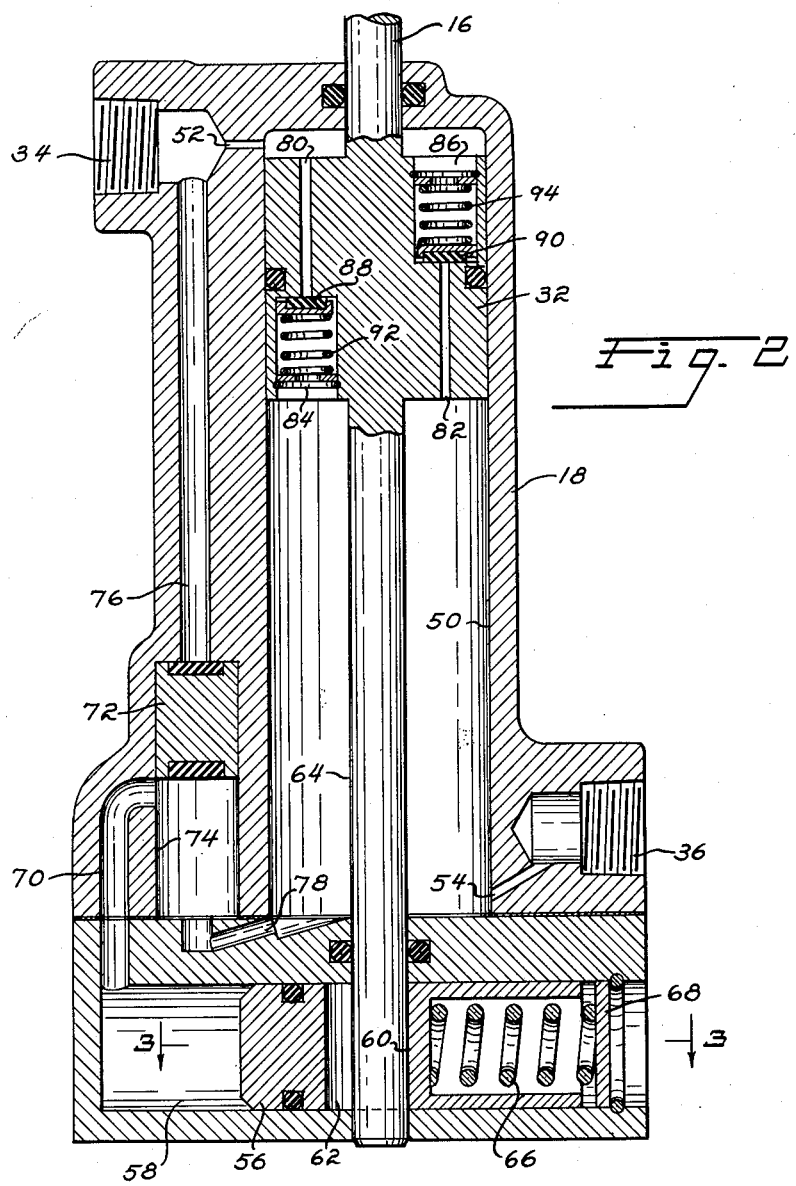
Fig. 2 is a vertical cross-section of a cylinder and double-acting piston constructed in accordance with the invention.

Referring now to Fig. 2, the cylinder casing 18 contains a cylinder 50 in which the double-acting piston 32 rides. The opposite ends of the cylinder 50 above and below the piston 32 are connected respectively to the ports 34, 36 by means of restricted orifices 52, 54, which may be of fixed size as shown or may be of controlled size by the use of suitable and well-known needle valves. The function of the orifices is to control the rate of fluid flow to the cylinder 50 and thus limit the maximum speed with which the piston and hence the window may be raised or lowered.

Figure 3:
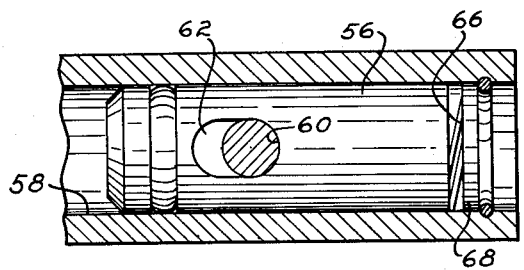
Fig. 3 is a horizontal cross-sectional view taken substantially along the line 3—3 of Fig. 2.

In order that the window may be retained in any desired position within its range of movement, an automatic locking and unlocking means is provided in the casing 18 and this comprises a locking member 56 which is horizontally movable in a cavity 58 to bring a braking surface 60 provided by the right hand end of an elliptical aperture 62 through member 56 into and out of braking engagement with an extension rod 64 integral with piston 32. The locking member 56 is moved to the right in Figs. 2 and 3 against the pressure of a spring 66 whose outer end bears on a stop 68. This stop serves not only as a spring abutment but it also serves to limit the movement of member 56 to something less than the length of aperture 62 thereby fully releasing rod 64 whenever actuating pressure is admitted to cavity 58 through a passage 70 which is alternatively connected with the pressure flowing either through port 34 or through port 36.

The alternative connection of the passage 70 with the ports 34 and 36 is accomplished through the positioning of a double check valve 72 which rides in a check valve cavity 74 to connect passage 70 with either a passage 76 leading to port 34 or with a passage 78 which is connected through the lower end of cylinder 50 with the ports 54 and 36. In the position shown in the drawing pressure is assumed to have entered port 36 thereby moving valve 72 to its upper position shown to close passage 76 and prevent fluid pressure at the lower end of the cylinder 50 from flowing to atmosphere through the vented upper port 34. With the valve 72 in its upper position, the passage 70 and hence cavity 58 are connected with the pressure flowing through the port 36 so that unlocking force is exerted on the end of member 56 moving it to the right in Fig. 2 to free extension rod 64 to permit the pressure in the lower end of cavity 50 to move the piston 32 upwardly. When the pressure in the cylinder is exhausted to atmosphere by return of the valve handle 38 to its neutral position, pressure is relieved from the end of member 56 and this then returns through the action of spring 66 to its position of the drawing to exert a braking pressure on rod 64 to retain the piston 32 in the proper position when the window is at its desired degree of opening. From the foregoing, it will be apparent that when pressure is admitted through port 34, pressure acts on check valve 72 moving it to its down position to close passage 78 while simultaneously connecting passage 70 to passage 76 to admit unlocking pressure to cavity 58 so that piston 32 may be moved downwardly.

An important feature of the present invention resides in novel means for limiting the opening or closing force which may be exerted on the window to a predetermined maximum with a view to preventing accidental injury to persons or objects which may be between the window and its frame, particularly when the window is being raised to closed position. This is accomplished in accordance with the invention by the provision of passages 80, 82 which afford connections between the opposite sides of the piston 32. The passages respectively connect with opposed valve cavities 84, 86 in the piston, each of which cavities respectively contain a relief valve 88, 90 urged to closed position by respective springs 92, 94. The loading of the relief valves is such that whenever the pressure on one side of the piston builds up to a point in excess of the maximum desired loading, the valve is forced off its seat to pass excess pressure through the piston to its opposite side and thence to atmosphere through the vented line on that side leading to the valve block 40. For example, assuming the window is to be raised so that air pressure is admitted to the upper end of cylinder 50 to move piston 32 downwardly. Should a child's hand, for example, be resting on the top of the window and raised therewith into engagement with the top of the window frame, it would be squeezed somewhat against the frame, but before serious injury resulted, the pressure above the piston would build up to a level unseating the relief valve 88 so that no additional force could be exerted on the hand. It should be understood that the relief valves can, if desired, be so loaded as to permit pressure to build up which is just sufficient to move the window against its weight and friction and so that only slight additional opposing force would be required to stop the window. A relatively low closing or opening force would not, of course, affect the window's inability to be opened independently of the pressure system, as by way of a forcible lowering from outside the vehicle by an unauthorized person, since once the window is in its desired position, it is effectively locked against any further movement by engagement of the locking member 56 with the extension rod 64 as above described. The locking force can, of course, be effectively controlled by the use of suitable braking substance on the locking surface 60 of the opening 62 in member 56 and by use of a suitably sized spring 66. It will be apparent to those skilled in the art, that the spring 66 must be properly related to the relief valve springs 92 and 94 so that sufficient pressure can be exerted on the locking member 56 to move it to unlocking position without the pressure being dissipated through premature opening of the relief valves 88, 90.

From the foregoing it is believed that the operation of the device of the invention should be obvious. Briefly, when air pressure is admitted from valve block 40 to either upper or lower cylinder ports 34, 36, the double check valve 72 is shifted by air pressure to close off the passage to the vented port and admit pressure from the other port to the cavity 58 to move the locking member 56 to unlocking position. Thereafter, air pressure action on the piston moves it a controlled rate as determined by the orifices 52, 54 in the appropriate direction to raise or lower the window. When the window is at its desired height, the valve lever 38 is released to return to its central neutral position to exhaust all fluid pressure from the cylinder 50 and hence from the cavity 58 so that the locking member 56 returns into locking engagement with the extension rod 64 to effectively lock the window in the desired position. Should the window, during its movement be in any way obstructed, as by a hand for example, pressure builds up on the appropriate side of the piston above the seating pressure of the appropriate relief valve 88 or 90 unseating this to relieve the pressure to the vented side of the piston thus limiting the force which may be exerted by the windown on the obstruction.

Having now fully described one embodiment of the present invention, it will be understood that the invention is susceptible of various changes and modifications without however, departing from the scope of the appended claims.

What is claimed is:

1. In combination, an air pressure motor comprising a casing, a cylinder in said casing, a double acting piston in said cylinder, piston rod means projecting exteriorly of said casing, port means at opposite ends of said cyinder for alternately admitting air pressure to one side or the other thereof for moving said piston, single locking means in said casing normally engaging said piston rod means to prevent movement thereof, pressure responsive means connected to said locking means for moving the same to unlocking position upon admission of air pressure thereto, first and second passage means respectively connecting said port means to said pressure responsive means, and a double acting pressure responsive check valve arranged to disconnect one of said passage means from said pressure responsive means while connecting the other passage means thereto when air pressure is admitted to the port connected to said last named passage means.

2. The combination of claim 1 including passages through said piston extending from one side to the other thereof and relief valves normally closing said passages and arranged in opposing relationship on opposite sides of said piston to relieve pressure acting on one side of said piston to the other when said pressure exceeds a predetermined maximum.

References Cited in the file of this patent

UNITED STATES PATENTS

| | | |
|---|---|---|
| 1,001,340 | Blauvelt | Aug. 22, 1911 |
| 1,085,964 | Briggs | Feb. 3, 1914 |
| 1,503,280 | Osbourne | July 29, 1924 |
| 1,692,034 | Griffin | Nov. 20, 1928 |
| 2,130,618 | Gnavi | Sept. 20, 1938 |
| 2,342,812 | Martinson | Feb. 29, 1944 |
| 2,364,715 | Horton | Dec. 12, 1944 |
| 2,378,103 | Rappl | June 12, 1945 |
| 2,378,409 | Joy | June 19, 1945 |
| 2,640,465 | McLeod | June 2, 1953 |
| 2,688,232 | Geyer | Sept. 7, 1954 |
| 2,698,157 | Ludeman | Dec. 28, 1954 |
| 2,709,420 | Fullwood et al. | May 31, 1955 |

FOREIGN PATENTS

| | | |
|---|---|---|
| 1,126,534 | France | July 30, 1956 |